US006415358B1

(12) United States Patent
Arimilli et al.

(10) Patent No.: US 6,415,358 B1
(45) Date of Patent: Jul. 2, 2002

(54) CACHE COHERENCY PROTOCOL HAVING AN IMPRECISE HOVERING (H) STATE FOR INSTRUCTIONS AND DATA

(75) Inventors: Ravi Kumar Arimilli, Austin; John Steven Dodson, Pflugerville; Jerry Don Lewis, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/024,322

(22) Filed: Feb. 17, 1998

(51) Int. Cl.$^7$ .............................................. G06F 12/00
(52) U.S. Cl. ........................ 711/134; 711/144; 711/152; 711/159
(58) Field of Search ................................ 711/144, 206, 711/133, 122, 134, 152, 159, 163, 136, 129; 709/207

(56) References Cited

U.S. PATENT DOCUMENTS

| | | | |
|---|---|---|---|
| 5,119,485 A | | 6/1992 | Ledbetter, Jr. et al. ...... 711/146 |
| 5,274,787 A | | 12/1993 | Hirano et al. ............... 711/143 |
| 5,282,272 A | * | 1/1994 | Guy et al. ................... 709/207 |
| 5,287,484 A | | 2/1994 | Nishi et al. |
| 5,319,766 A | * | 6/1994 | Thaller et al. ............... 395/425 |
| 5,522,057 A | | 5/1996 | Lichy .......................... 711/144 |
| 5,551,001 A | * | 8/1996 | Cohen et al. ................ 395/449 |
| 5,588,131 A | | 12/1996 | Borrill ......................... 711/146 |
| 5,598,550 A | | 1/1997 | Shen et al. .................. 711/146 |
| 5,666,509 A | * | 9/1997 | McCarthy et al. ........... 711/206 |
| 5,671,391 A | | 9/1997 | Knotts ......................... 711/143 |
| 5,737,757 A | | 4/1998 | Hassoun et al. ............. 711/145 |
| 5,900,016 A | | 5/1999 | Ghosh ......................... 711/143 |
| 6,014,728 A | * | 1/2000 | Baror .......................... 711/133 |
| 6,038,644 A | | 3/2000 | Irie et al. .................... 711/141 |
| 6,049,849 A | | 4/2000 | Armilli et al. .............. 711/133 |

FOREIGN PATENT DOCUMENTS

| | | |
|---|---|---|
| EP | 0378399 A2 | 7/1990 |
| EP | 0438211 A2 | 7/1991 |
| EP | 0489556 A2 | 6/1992 |
| EP | 0681241 A1 | 11/1995 |
| GB | 2178205 A | 2/1987 |
| JP | 3253963 A | 11/1991 |
| JP | 06110785 A | 4/1994 |
| JP | 06110844 A | 4/1994 |

OTHER PUBLICATIONS

Hamaguchi, "Proposal of a Revalidating–Type Multi–Cache Consistency Protocol and its Evaluation", Information System Research Center, Canon, Inc., pp. 115–120.

Eggers et al., "Evaluating the Performance of Four Snooping Cache Coherency Protocols," Computer Architecture Conference Proceedings, Washington, No. 3, Jun. 17, 1989, pp. 2–15.

* cited by examiner

Primary Examiner—Matthew Kim
Assistant Examiner—Brian R. Peugh
(74) Attorney, Agent, or Firm—Volel Emile; Felsman, Bradley, Vaden, Gunter & Dillon, LLP

(57) ABSTRACT

A cache and method of maintaining cache coherency in a data processing system are described. The data processing system includes a plurality of processors that are each associated with a respective one of a plurality of caches. According to the method, a first data item is stored in a first of the caches in association with an address tag indicating an address of the data item. A coherency indicator in the first cache is set to a first state that indicates that the data item is valid. In response to another of the caches indicating an intent to store to the address indicated by the address tag while the coherency indicator is set to the first state, the coherency indicator in the first cache is updated to a second state that indicates that the address tag is valid and that the first data item in the first cache is invalid. Thereafter, in response to detection of a data transfer associated with the address indicated by the address tag while the coherency indicator is set to the second state, the first cache is refreshed by replacing the first data item with a second data item in the data transfer and updating the coherency indicator to a third state that indicates that the second data item is valid.

16 Claims, 3 Drawing Sheets

CACHE COHERENCY PROTOCOL HAVING AN IMPRECISE HOVERING (H) STATE FOR INSTRUCTIONS AND DATA

BACKGROUND OF THE INVENTION

1. Technical Field

The present invention relates in general to a method and system for data processing and in particular to a method and system for maintaining data coherency in a multiprocessor data processing system. Still more particularly, the present invention relates to a cache coherency protocol for a multiprocessor data processing system, which includes a hovering (H) state that permits a first cache to be updated with valid data in response to a second cache independently transmitting the valid data on an interconnect coupling the first and second caches.

2. Description of the Related Art

In a conventional symmetric multiprocessor (SMP) data processing system, all of the processors are generally identical, that is, the processors all utilize common instruction sets and communication protocols, have similar hardware architectures, and are generally provided with similar memory hierarchies. For example, a conventional SMP data processing system may comprise a system memory, a plurality of processing elements that each include a processor and one or more levels of cache memory, and a system bus coupling the processing elements to each other and to the system memory. To obtain valid execution results in an SMP data processing system, it is important to maintain a coherent memory hierarchy, that is, to provide a single view of the contents of memory to all of the processors.

A coherent memory hierarchy is maintained through the use of a selected memory coherency protocol, such as the MESI protocol. In the MESI protocol, an indication of a coherency state is stored in association with each coherency granule (e.g., cache line or sector) of at least all upper level (cache) memories. Each coherency granule can have one of four states, modified (M), exclusive (E), shared (S), or invalid (I), which is indicated by two bits in the cache directory. The modified state indicates that a coherency granule is valid only in the cache storing the modified coherency granule and that the value of the modified coherency granule has not been written to system memory. When a coherency granule is indicated as exclusive, the coherency granule is resident in, of all caches at that level of the memory hierarchy, only the cache having the coherency granule in the exclusive state. The data in the exclusive state is consistent with system memory, however. If a coherency granule is marked as shared in a cache directory, the coherency granule is resident in the associated cache and in at least one other cache at the same level of the memory hierarchy, all of the copies of the coherency granule being consistent with system memory. Finally, the invalid state indicates that the data and address tag associated with a coherency granule are both invalid.

The state to which each coherency granule (e.g., cache line) is set is dependent upon both a previous state of the cache line and the type of memory access sought by a requesting processor. Accordingly, maintaining memory coherency in the multiprocessor data processing system requires that the processors communicate messages across the system bus indicating their intention to read or write memory locations. For example, when a processor desires to write data to a memory location, the processor must first inform all other processing elements of its intention to write data to the memory location and receive permission from all other processing elements to carry out the write operation. The permission messages received by the requesting processor indicate that all other cached copies of the contents of the memory location have been invalidated, thereby guaranteeing that the other processors will not access stale local data. This exchange of messages is known as cross-invalidation (XI).

The present invention includes a recognition that while cross-invalidation of cache entries serves to maintain memory coherency in a SMP data processing system, the invalidation of cache entries by remote processors adversely affects data processing system performance by decreasing hit ratios in local caches. Thus, even if equipped with large local caches, a processing element can incur long access latencies when retrieving data that were once resident in a local cache from either a remote cache in another processing element or from system memory. As should thus be apparent, it would be desirable to provide a method and system for maintaining memory coherency in a SMP data processing system that reduces the performance penalty incurred as a result of the cross-invalidation of cache entries.

SUMMARY OF THE INVENTION

It is therefore one object of the present invention to provide an improved method and system for data processing.

It is another object of the present invention to provide an improved method and system for maintaining data coherency in a multiprocessor data processing system.

It is yet another object of the present invention to provide a cache coherency protocol for a multiprocessor data processing system, which includes a hovering (H) state that permits a first cache to be updated with valid data in response to a second cache independently transmitting the valid data on an interconnect coupling the first and second caches.

The foregoing objects are achieved as is now described. A data processing system is provided that includes a plurality of processors which are each associated with a respective one of a plurality of caches. A first data item is stored in a first of the caches in association with an address tag indicating an address of the data item. A coherency indicator in the first cache is set to a first state that indicates that the data item is valid. In response to another of the caches indicating an intent to store to the address indicated by the address tag while the coherency indicator is set to the first state, the coherency indicator in the first cache is updated to a second state that indicates that the address tag is valid and that the first data item in the first cache is invalid. Thereafter, in response to detection of a data transfer associated with the address indicated by the address tag while the coherency indicator is set to the second state, the first cache is refreshed by replacing the first data item with a second data item in the data transfer and updating the coherency indicator to a third state that indicates that the second data item is valid.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
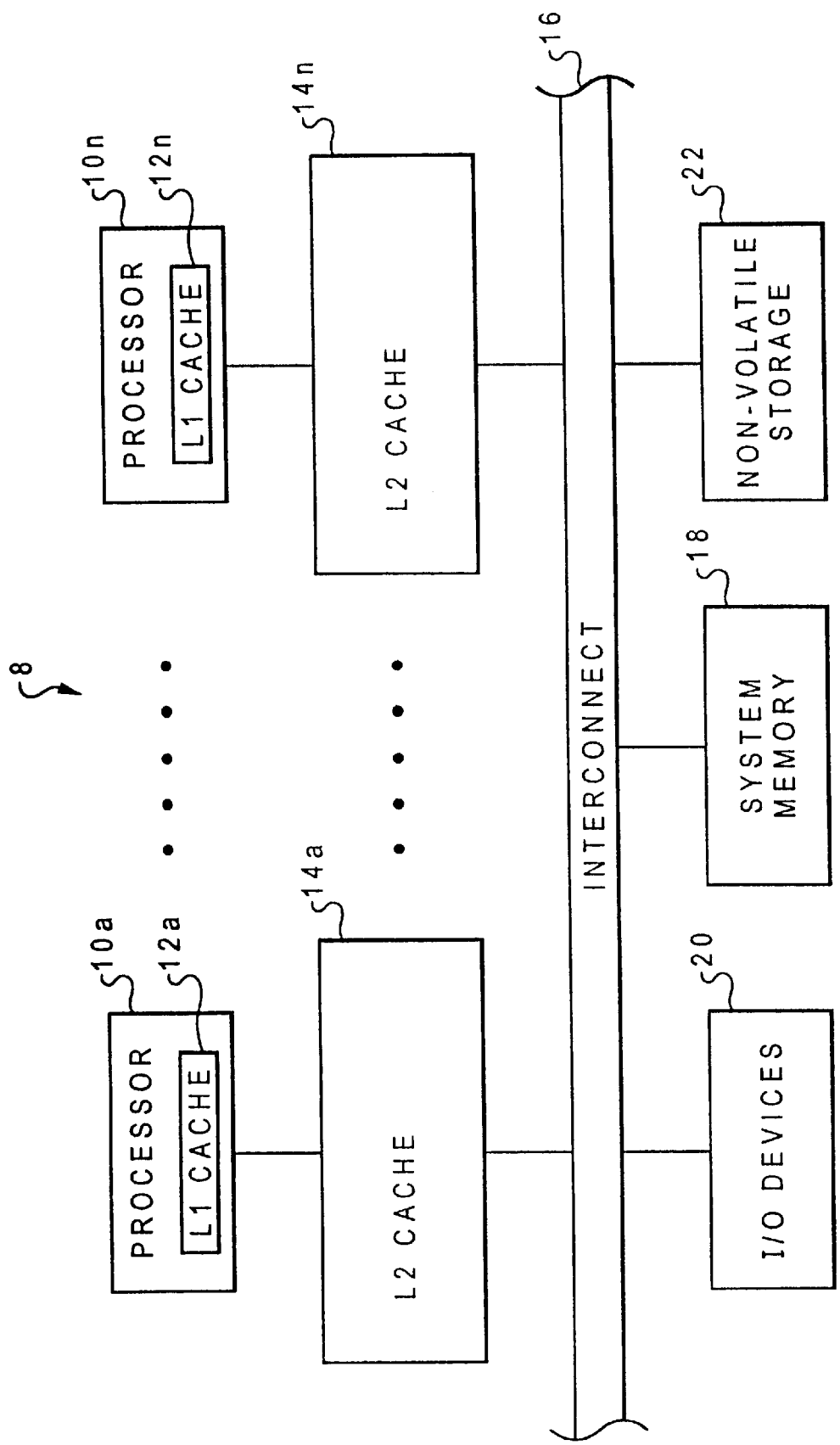
FIG. 1 depicts an illustrative embodiment of a multiprocessor data processing system in accordance with the present invention.

With reference now to the figures, and in particular with reference to FIG. 1, there is illustrated a high level block diagram of a multiprocessor data processing system in accordance with the present invention. As depicted, data processing system 8 includes a number of processors 10a–10n, which each preferably comprise one of the PowerPC™ line of processors available from Internal Business Machines Corporation. In addition to the conventional registers, instruction flow logic and execution units utilized to execute program instructions, each of processors 10a–10n also includes an associated one of on-board level one (L1) caches 12a–12n, which temporarily stores instructions and data that are likely to be accessed by the associated processor. Although L1 caches 12a–12n are illustrated in FIG. 1 as unified caches that store both instruction and data (both referred to hereinafter simply as data), those skilled in the art will appreciate that each of L1 caches 12a–12n could alternatively be implemented as bifurcated instruction and data caches.

In order to minimize access latency, data processing system 8 also includes one or more additional levels of cache memory, such as level two (L2) caches 14a–14n, which are utilized to stage data to L1 caches 12a–12n. In other words, L2 caches 14a–14n function as intermediate storage between system memory 18 and L1 caches 12a–12n, and can typically store a much larger amount of data than L1 caches 12a–12n, but at a longer access latency. For example, L2 caches 14a–14n may have a storage capacity of 256 or 512 kilobytes, while L1 caches 12a–12n may have a storage capacity of 64 or 128 kilobytes. As noted above, although FIG. 1 depicts only two levels of cache, the memory hierarchy of data processing system 8 could be expanded to include additional levels (L3, L4, etc.) of serially-connected or lookaside caches.

As illustrated, data processing system 8 further includes I/O devices 20, system memory 18, and non-volatile storage 22, which are each coupled to interconnect 16. I/O devices 20 comprise conventional peripheral devices, such as a display device, keyboard, and graphical pointer, which are interfaced to interconnect 16 via conventional adapters. Non-volatile storage 22 stores an operating system and other software, which are loaded into volatile system memory 18 in response to data processing system 8 being powered on. Of course, those skilled in the art will appreciate that data processing system 8 can include many additional components that are not shown in FIG. 1, such as serial and parallel ports for connection to networks or attached devices, a memory controller that regulates access to system memory 18, etc.

Interconnect 16, which can comprise one or more buses or a cross-point switch, serves as a conduit for communication transactions between L2 caches 14a–14n, system memory 18, input/output (I/O) devices 20, and non-volatile storage 22. A typical communication transaction on interconnect 16 includes a source tag indicating the source of the transaction, a destination tag specifying the intended recipient of the transaction, an address and/or data. Each device coupled to interconnect 16 preferably snoops all communication transactions on interconnect 16.

Figure 2:
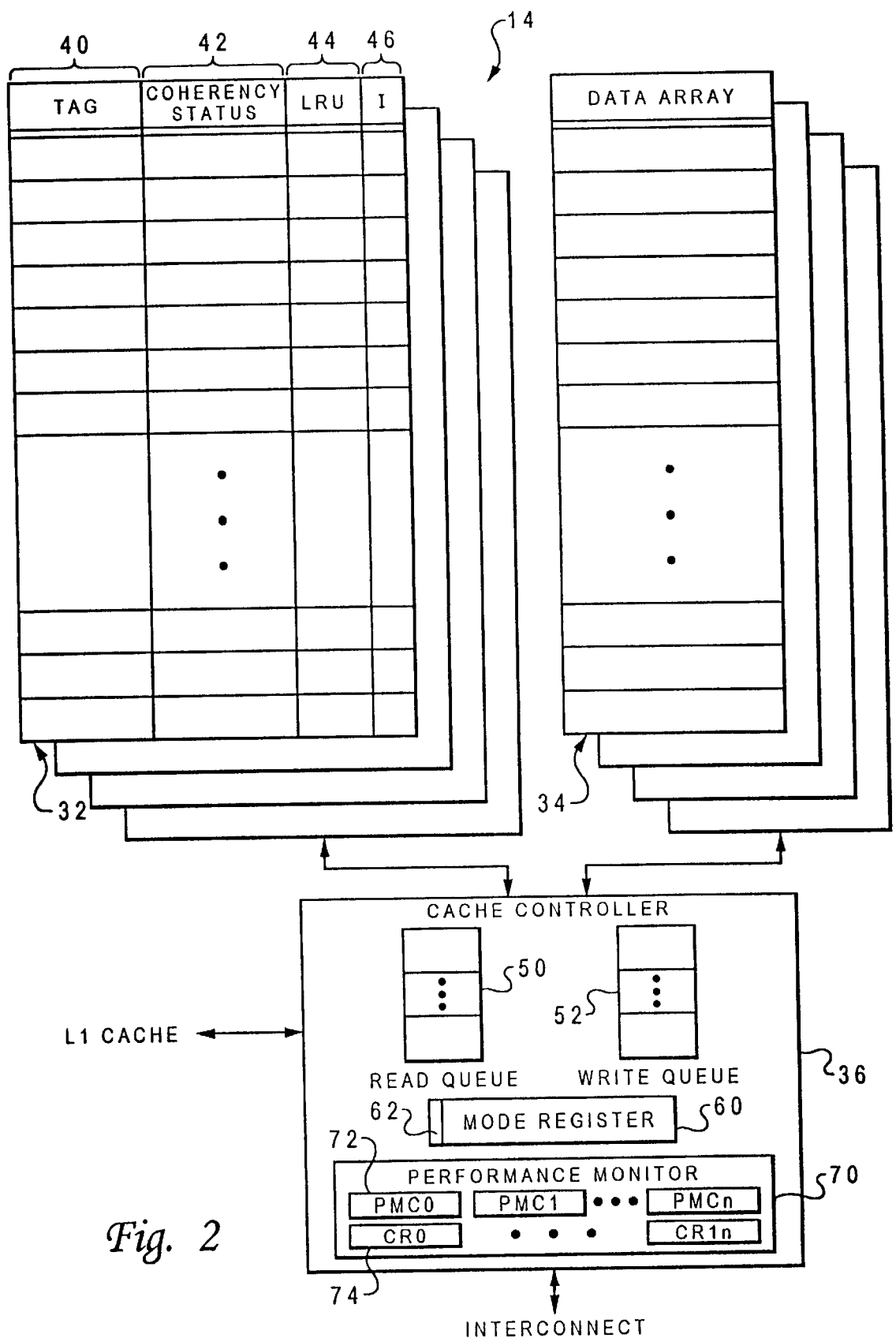
FIG. 2 is a block diagram depicting an illustrative embodiment of a cache in accordance with the present invention.

With reference now to FIG. 2, there is depicted a more detailed block diagram of an illustrative embodiment of an L2 cache 14 in accordance with the present invention. In the illustrative embodiment, L2 cache 14 is a four-way set associative cache that utilizes 32-bit addresses. Accordingly, data array 34 of L2 cache 14 comprises a number of congruence classes that each contain 4 ways for storing cache lines. As in conventional set associative caches, memory locations in system memory 18 are mapped to particular congruence classes within data array 34 utilizing index bits within the address of the memory location (e.g., bits 20–26 of a 32-bit address).

The cache lines stored within data array 34 are recorded in cache directory 32, which contains one directory entry for each way in data array 34. Each directory entry comprises a tag field 40, coherency status field 42, least recently used (LRU) field 44, and inclusion field 46. Tag field 40 specifies which cache line is stored in the corresponding way of data array 34 by storing the tag bits (e.g., bits 0–19) of the system memory address of the cache line. As discussed in detail below with reference to FIG. 3, coherency status field 42 indicates the coherency status of the data stored in the corresponding way of data array 34 utilizing predefined bit combinations. LRU field 44 indicates how recently the corresponding way of data array 34 has been accessed relative to the other ways of its congruence class, thereby indicating which cache line should be cast out of the congruence class in response to a cache miss. Finally, inclusion field 46 indicates whether or not the cache line stored in the corresponding way of data array 34 is also stored in the associated L1 cache 12.

Still referring to FIG. 2, L2 cache 14 further includes cache controller 36, which manages storage and retrieval of data within data array 34 and updates to cache directory 32 in response to signals received from the associated L1 cache 12 and transactions snooped on interconnect 16. As illustrated, cache controller 36 contains a read queue 50 and a write queue 52 from which cache controller 36 performs updates to cache directory 32 and accesses to data array 34. For example, in response to receiving a read request from the associated L1 cache 12, cache controller 36 places the read request in an entry within read queue 50. Cache controller 36 services the read request by supplying the requested data to the associated L1 cache 12 and thereafter removes the read request from read queue 50. As another example, cache controller 36 may snoop a transaction initiated by another of L2 caches 14a–14n indicating that a remote processor 10 intends to modify its local copy of a specified cache line. In response to snooping this transaction, cache controller 36 places a request to read cache directory 32 in read queue 50 in order to determine if the specified cache line is resident in data array 34. If so, cache controller 36 places an appropriate response on interconnect 16 and, if necessary, inserts a directory write request in write queue 52, that when serviced, updates the coherency status field associated with the specified cache line. Although FIG. 2 illustrates an embodiment in which only one read queue and one write queue are utilized, it should be understood that the number of queues employed by cache controller 36 is a matter of design choice and that cache controller 36 may employ separate queues for cache directory accesses and data array accesses.

Cache controller 36 further includes mode register 60, which, as described in greater detail below, comprises one or more bits whose settings control the operation of cache controller 36. In addition, cache controller 36 includes performance monitor 70. Performance monitor 70 is equipped with a number of performance monitor counters (PMC0–PMCn) 72 that, when enabled, increment in response to each occurrence of an event or combination of events specified by one or more control registers (CR0–CRm) 74. The events that may be counted by PMCs 72 in response to the settings of CRs 74 include cache hits, cache misses, the number of entries in a specified queue, access latency for L2 cache hits, access latency for L2 cache misses, etc. Each of PMCs 72 and CRs 74 are preferably memory mapped registers that may be read and written by the associated processor 10 via load and store instructions.

Figure 3:
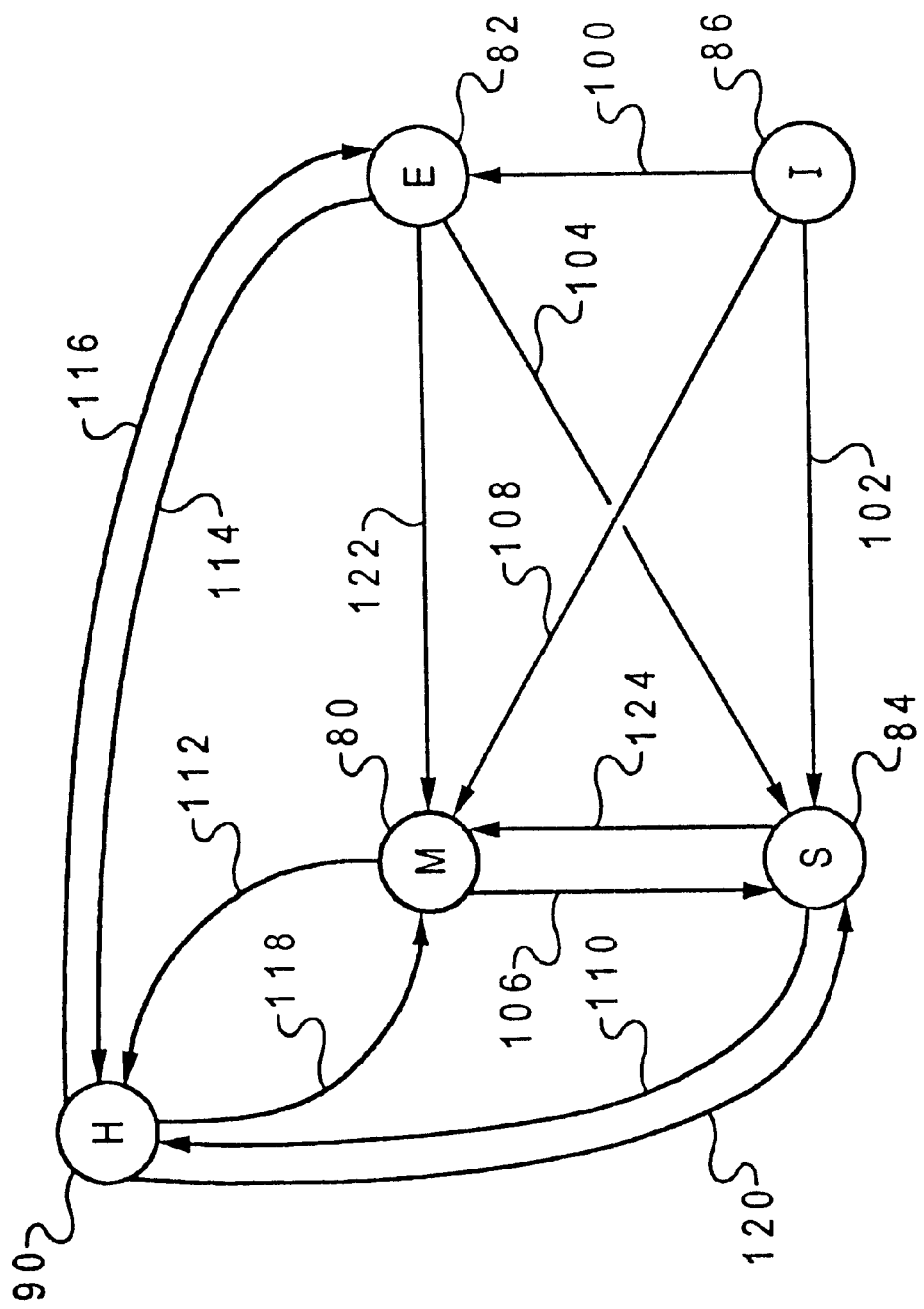
FIG. 3 is a state diagram depicting an illustrative embodiment of the H-MESI memory coherency protocol of the present invention.

With reference now to FIG. 3, there is depicted an illustrative embodiment of the H-MESI memory coherency protocol of the present invention. The H-MESI protocol is preferably implemented only by the lowest level of cache in the memory hierarchy (e.g., L2 caches 14a–14n in the embodiment of data processing system 8 illustrated in FIG. 1), while higher level caches preferably implement the conventional MESI protocol. However, in alternative embodiments of data processing system 8, the H-MESI protocol may be implemented at each level of cache in the memory hierarchy at the expense of additional inter-cache communication traffic.

As shown in FIG. 3, the H-MESI memory coherency protocol includes the conventional modified (M), exclusive (E), shared (S), and invalid (I) states of the MESI protocol, which are respectively identified by reference numerals 80, 82, 84, and 86. In addition, the H-MESI memory coherency protocol of the present invention includes hovering (H) state 90, which indicates that the address tag stored in the associated tag field 40 is valid but that the data item (e.g., cache line or cache sector) stored in the corresponding way of data array 34 is invalid.

In a preferred embodiment, coherency status field 42 of each entry of each L2 cache directory 32 is initialized to I state 86 at power-on to indicate that both tag field 40 and the data stored in the corresponding way of data array 34 are invalid. L1 cache directory entries are similarly initialized to the invalid state according to the conventional MESI protocol. Thereafter, the coherency status of a cache line (or cache sector) stored in one of L2 caches 14a–14n in invalid state 86 can be updated to one of M state 80, E state 82, or S state 84, depending upon both the types of memory requests made by processors 10a–10n and the response of the memory hierarchy to those requests.

For example, if processor 10a makes a read request in response to a load instruction, L1 cache 12a makes a determination of whether or not the requested data is resident in L1 cache 12a. In response to a hit in L1 cache 12a, L1 cache 12a simply supplies the requested data to processor 10a. However, in response to miss in L1 cache 12a, L1 cache 12a forwards the read request to L2 cache 14a via inter-cache connections. In response to a hit in L2 cache 14a, the requested data is supplied by L2 cache 14a to L1 cache 12a, which stores the requested data in association with the appropriate MESI coherency status and forwards the requested data to processor 10a. If, however, the read request misses in both L1 cache 12a and L2 cache 14a, cache controller 36 of L2 cache 14a presents the read request as a transaction on interconnect 16, which is snooped by each of L2 caches 14b–14n.

In response to snooping the read request on interconnect 16, cache controller 36 in each of L2 caches 14b–14n determines if the requested data is resident in its data array 34 or the associated one of L1 caches 12b–12n. If none of L2 caches 14b–14n or L1 caches 12b–12n stores the requested data, each of L2 caches 14a–14n returns a null response to L2 cache 14a, which then requests the data from system memory 18. When the requested data is returned to L2 cache 14a from system memory 18, cache controller 36 forwards the requested data to L1 cache 12a, stores the requested data in its data array 34, and updates the coherency status field 42 associated with the way storing the requested data from I state 86 to E state 82, as indicated by reference numeral 100. As in the conventional MESI protocol, E state 82 indicates that the associated cache line is valid and is not resident in any other cache at the second level of the memory hierarchy.

Similarly, if any of L1 cache 12b–12n or L2 caches 14b–14n stores the requested data in E state 82 or S state 84 and so indicates in a "shared" response to the read request placed on interconnect 16 by L2 cache 14a, L2 cache 14a retrieves the requested data from system memory 18. In this case, however, the coherency status of the way in L2 cache 14a that stores the requested data makes a transition from I state 86 to S state 84, as indicated by reference numeral 102. Others of L2 caches 14 storing the requested data in E state 82 are also updated to S state 84, as indicated by reference numeral 104.

If the data requested by processor 10a is not resident in L1 cache 12a and L2 cache 14a but is stored, for example, in L1 cache 12n in M state 80, cache controller 36 of L2 cache 14n responds to the read request with a retry and signals L1 cache 12n to push the requested data to memory. The coherency status of the requested data in L1 cache 12n and L2 cache 14n is then updated to S state 84 as indicated by reference numeral 106. Thereafter, when L2 cache 14a retries the read request on interconnect 16, L2 cache 14n replies with a shared response and L2 cache 14a obtains the requested data from system memory 18 as discussed above. In an alternative embodiment that supports so-called modified intervention, the requested data is sourced by cache controller 36 of L2 cache 14n rather than by system memory 18, thereby reducing access latency.

If instead of a read request L1 cache 12a issues a "read with intent to modify" request indicating that processor 10a desires to acquire exclusive use of a memory location for the purpose of modifying it, the above-described process of obtaining the cache line containing the specified memory location is followed. However, when the requested cache line is obtained, L1 cache 12a stores the requested cache line in modified state. In addition, because the "read with intent to modify" transaction indicates that other copies of the requested cache line will become stale, the other L1 and L2 caches must indicate that their copies of the requested cache line are invalid. In L1 caches 12b–12n, any copies of the requested cache line are simply marked as invalid. However, the coherency status of copies of the requested cache line stored in L2 caches 14b–14n are not updated to I state 86 as in conventional multiprocessor data processing systems that utilize cross-invalidation (XI). Instead, in accordance with an important aspect of the present invention, each of L2 caches 14b–14n storing a copy of the requested cache line updates the coherency status field 42 associated with its copy from any of S state 84, M state 80, or E state 82 to H state 90, as indicated by reference numerals 110, 112, and 114, respectively. As noted above, H state 90 indicates that the tag stored in tag field 40 remains valid, but that the associated cache line within data array 34 is invalid. Entries in a cache directory 32 are similarly updated to H state 90 in response to other snooped transactions that require data to be invalidated, including kills (i.e., transactions that explicitly invalidate a specified data block), flushes (i.e., transactions that invalidate a specified data block and copy any modified data to system memory), dclaims (i.e., transactions that invalidate copies of a cache line marked as shared in remote caches in response to a local copy of the cache line becoming modified in response to a store), etc.

As indicated by reference numerals 116, 118, and 120, a cache directory entry can make a transition from H state 90 to E state 82, M state 80, or S state 84, depending upon what type of transactions are received by the cache. For example, a directory entry of L2 cache 14a that is in H state 90 makes a transition to E state 82 (as indicated by reference numeral 86) in response to processor 10a making a read request that (after missing in both L1 cache 12a and L2 cache 14a) receives a null response from L2 caches 14b–14n since the data retrieved from system memory 18 will, of all L2 caches 14a–14n, be stored only in L2 cache 14a. If, on the other hand, processor 10a indicates an intent to store data to a way of L1 cache 12a that is in H state 90, L1 cache 12a indicates that intent to L2 cache 14a, which then issues a "read with intent to modify" transaction on interconnect 16. As discussed above, copies of the requested cache line stored in L2 caches 14b–14n are updated to H state 90 in response to snooping the "read with intent to modify" transaction, and copies of the requested cache line stored in L1 caches 12b–12n are marked as invalid. Once the requested cache line is returned to L1 cache 12a and processor 10a updates the cache line, the cache line is marked as modified in L1 cache 12a to signify that the cache line is valid, but is not coherent with system memory 18. Depending on the implementation, the modified cache line may subsequently be stored in L2 cache 14a (e.g., in response to an L1 castout) without the modified cache line being written back to system memory 18. If so, the coherency status field 42 in L2 cache 14a associated with the modified cache line is updated to M state 80, as indicated by reference numeral 118. Finally, an L2 cache directory entry in H state 90 is updated to S state 84 in response to a number of different request/response scenarios.

First, an L2 directory entry in H state 90 transitions to S state 84 when the associated processor 10 issues a read request to the address indicated by the (valid) address tag in tag field 40 and at least one L2 cache 14 replies with a shared response. More importantly, an L2 directory entry in H state 90 can be updated to S state 84 without the associated processor 10 issuing a data request or the L2 cache 14 initiating a transaction on interconnect 16. As described above, each of L2 caches 14a–14n snoops all transactions issued on interconnect 16. If one of L2 caches 14a–14n, for example, L2 cache 14a, snoops a transaction issued by another of L2 caches 14b–14n that includes an updated (i.e., valid) copy of data that is stored in L2 cache 14a in H state 90, cache controller 36 of L2 cache 14a samples the data from interconnect 16, stores the snooped data in data array 34, and updates the associated coherency status field 42 from H state 90 to S state 84. Of course, L2 cache 14a also provides a response to the snooped transaction, if a response is required to maintain coherency. For example, if the snooped transaction is a read request, L2 cache 14a must provide a shared response indicating its intention to sample the requested data so that the requesting L2 cache stores the requested data in S state 84 rather than E state 82. Transactions on interconnect 16 that can be snooped in this way to refresh invalid data associated with a valid address tag include read transactions, write transactions, data writebacks to system memory 18 due to cache line castouts, etc.

State transitions that may be made in the illustrative embodiment of the H-MESI memory coherency protocol depicted in FIG. 3 are summarized below in Table I.

TABLE I

| State Transition | Causes | Notes |
| --- | --- | --- |
| I → E | cpu read with null response | |
| I → S | cpu read with shared or modified response | |
| I → M | cpu "read with intent to modify" (rwitm) | |
| E → S | snooped read | |
| E → M | cpu rwitm | |
| E → H | snooped data invalidate | snooped data invalidate = rwitm, dclaim, kill, flush, etc. |
| S → M | cpu rwitm | issue dclaim on interconnect |
| S → H | snooped data invalidate | |
| M → S | snooped read | source data if modified intervention is supported |
| M → H | snooped data invalidate | if snooped transaction is rwitm, source data if modified intervention is supported |
| H → E | cpu read with null response | |
| H → S | cpu read with shared or modified response; snooped read or write | |
| H → M | cpu rwitm | |

According to an important aspect of the present invention, the H-MESI protocol can be implemented either precisely or imprecisely. A precise implementation of the H-MESI protocol requires that L2 caches 14a–14n always sample data available on interconnect 16 to refresh invalid cache lines in H state 90. In contrast, an imprecise implementation permits L2 caches 14a–14n to selectively sample data on interconnect 16 to refresh cache lines in H state 90. In the illustrative embodiment depicted in FIG. 2, each L2 cache 14 can, independently of the other L2 caches, operate in either a precise mode or an imprecise mode based upon the state of mode bit 62 in its mode register 60.

Operating L2 caches 14a–14n in precise mode is particularly advantageous when debugging or performance-tuning software because the precise mode of operation promotes more predictable software behavior and consistent software timing. In addition, in the precise mode, data requests that miss at both levels of local cache (and require the local L2 cache 14 to issue a transaction on interconnect 16) are typically rare and can therefore serve as indications of possible "bugs" in the software. Moreover, in embodiments of the present invention that support modified intervention, the precise H-MESI protocol guarantees that data that is requested by a processor 10 and is stored in the local L2 cache 14 in H state 90 will always be sourced by modified intervention (i.e., fast). A chief disadvantage of operating an L2 cache 14 in the precise mode is that snooped transactions capable of updating an L2 cache line in H state 90 must be retried if the update cannot be performed, for example, due to write queue 52 of the L2 cache 14 being full (i.e., busy).

Because it is desirable not to retry necessary operations, for example, read requests, in order to perform optional updates of cache lines in H state 90, it is typically preferable for L2 caches 14a–14n to be in the imprecise mode during normal operation. As noted above, the imprecise mode of operation permits updates to cache lines in H state 90 to be performed selectively. In a preferred embodiment, when an L2 cache 14 is in imprecise mode, updates to cache lines in H state 90 are performed only if write queue 52 (or a dedicated directory write queue, if implemented) has less than a threshold number of entries. Thus, either hardware within the L2 cache 14 or software executed by the associated processor 10 can be used to set mode bit 62 to the state corresponding to the imprecise mode in response to the number of entries in write queue 52 exceeding a predetermined threshold. However, other embodiments of the present invention may selectively perform updates to L2 cache lines in H state 90 based on other criteria, as described in detail below.

In the illustrative embodiment of data processing system 8 shown in FIG. 2, each of L2 caches 14a–14n can independently be set to precise mode or imprecise mode by either software or hardware or both. For example, if software control of the mode in which L2 cache 14a operates is desired, processor 10a can simply set mode bit 62 by executing a store instruction that targets mode register 60. Alternatively, software can store values to CRs 74 that cause PMCs 72 to count occurrences of events of interest, such as the insertion and removal of entries in write queue 52, L2 accesses, L2 cache misses, access latency on L2 cache misses, etc. The software can then access the values in the PMCs 72 of interest by executing load instructions. In response to one or a combination of the values of PMCs 72 exceeding software-determined thresholds, the software can set mode bit 62 to select the appropriate one of the precise and imprecise modes. For example, if L2 cache 14a is operating in the imprecise mode and the number of L2 cache misses is greater than a predetermined percentage of the total number of L2 accesses, software can set mode bit 62 to the state corresponding to the precise mode.

Hardware control of the mode of operation of L2 caches 14a–14n can similarly be implemented by performance monitor 70. In an illustrative embodiment, each performance monitor 70 includes logic for generating a signal that sets mode bit 62 to a specified state in response to the number of occurrences of a selected event or combination of events accumulated in one or more of PMCs 72 exceeding a predetermined threshold. The selection of the event or events of interest and the enablement of PMCs 72 can be determined either by default settings of performance monitor 70 or by software executed by the associated processor 10. In yet another embodiment, performance monitor 70 can be set to generate a performance monitor interrupt (PMI) in response to the number of occurrences of a selected event or combination of events exceeding a predetermined threshold. The PMI is serviced by the associated processor 10, which executes an interrupt handler that changes the state of mode bit 62.

As has been described, the present invention provides an improved method and system for maintaining memory coherency in a multiprocessor data processing system. The improved memory coherency protocol provided by the present invention permits an invalid data item stored within a cache in association with a valid address tag to be automatically updated with valid data without the associated processor issuing an explicit read or write request. In this manner, data invalidated by the activity of remote processors can be refreshed prior to the data being accessed by the local processor, thereby substantially reducing access latency by eliminating the need to retrieve the data from a remote cache or system memory. Contention for memory access and system-wide locks is also substantially reduced since cache lines are updated without accessing memory or requesting a lock.

While the invention has been particularly shown and described with reference to an illustrative embodiment, it will be understood by those skilled in the art that various changes in form and detail may be made therein without departing from the spirit and scope of the invention. For example, the illustrative embodiment of a memory coherency protocol depicted in FIG. 3 could be modified by eliminating I state 86 because that state is only utilized to initialize directory entries at power-on and is never re-entered from another state. If I state 86 were eliminated, at power-on the coherency status field of each L2 directory entry would be initialized to H state 90, and the tag field of each L2 directory entry would be initialized to a tag value that is unique at least within the same congruence class. In addition, it should be understood that performance monitor 70 of FIG. 2 could alternatively be implemented as a single system-wide performance monitor coupled to interconnect 16 rather than as multiple separate performance monitors internal to each L2 cache 14.

What is claimed is:

1. A method of maintaining cache coherency in a data processing system including a plurality of processors that are each associated with a respective one of a plurality of caches and an interconnect coupling said processors, said method comprising:

in a first cache among said plurality of caches, storing a first data item in association with an address tag indicating an address of said first data item and setting a coherency indicator in said first cache to a data-invalid state that indicates that said address tag is valid and that said first data item in said first cache is invalid; and in response to subsequent detection of a data transfer on said interconnect associated with said address indicated by said address tag, said data transfer being initiated by another of said plurality of caches and including a second data item, selectively updating said first cache with said second data item only if a number of updates to said first cache pending within a queue of a cache controller of said first cache is less than a threshold number, wherein selectively refreshing said first cache includes said cache controller (1) temporarily allocating an entry of said queue, (2) replacing said first data item by storing said second data item in said first cache in association with said address tag, and (3) updating said coherency indicator from said data-invalid state to a valid state to indicate that said second data item is valid.

2. The method of claim 1, wherein said step of updating said coherency indicator to a valid state comprises updating said coherency indicator to a shared state that indicates that said second data item is stored in both said first cache and another of said plurality of caches.

3. The method of claim 1, wherein
    said method further comprises setting the coherency indicator in said first cache to one of modified state, shared state, and exclusive state; and
    thereafter performing said setting step in response to snooping a data invalidate transaction on the interconnect.

4. The method of claim 5, wherein snooping said data invalidation transaction comprises said first cache snooping a read-with-intent-to-modify transaction on said interconnect.

5. The method of claim 1, wherein said plurality of processors includes a first processor associated with said first cache and a second processor associated with a second cache among said plurality of caches, said method further comprising the step of:

in response to a request by said first processor for data associated with said address indicated by said address tag while said coherency indicator is set to said second state, sourcing a data transfer including said second data item from said second cache.

6. The method of claim 1, and further comprising initiating said data transfer by said another of said plurality of caches by issuing a read-type request.

7. A cache for supporting cache coherency in a data processing system including a plurality of processors that are each associated with a respective one of a plurality of caches and an interconnect coupling said plurality of processors, said cache comprising:

data storage;

tag storage that stores an address tag indicating an address of a data item contained in said data storage;

a coherency indicator having one or more valid states to indicate that an associated data item in said data storage is valid and a data-invalid state to indicate that said address tag in said tag storage is valid and that a data item in said data storage is invalid; and a cache controller including a queue from which said cache controller updates said cache, wherein responsive to detection of a data transfer on said interconnect associated with said address indicated by said address tag while said coherency indicator is set to said data-invalid state, said data transfer including a second data item, said cache controller selectively updating said cache with said second data item only if a number of updates pending in said queue is less than a threshold number by (1) temporarily allocating an entry of said queue, (2) storing said second data item in said data storage in association with said address tag and (3) updating said coherency indicator to one of said one or more valid states.

8. The cache of claim 7, wherein said one or more valid states include a shared state to which said cache controller updates said coherency indicator when updating said cache to indicate that said second data item is stored in both said cache and another of said plurality of caches.

9. The cache of claim 7, wherein said cache is a first cache and said plurality of processors includes a first processor associated with said first cache, said cache controller further comprising:

means, responsive to a request by said first processor for data associated with said address indicated by said address tag while said coherency indicator is set to said data-invalid state, for requesting valid data associated with said address from one of said plurality of caches associated with a processor among said plurality of processors other than said first processor.

10. The cache of claim 7, said coherency indicator further comprising an invalid state that indicates that both of said address tag and said first data item are invalid.

11. The cache of claim 7, wherein said data transfer comprises a response to a read-type request on said interconnect.

12. A data processing system, comprising:

an interconnect;

a plurality of processors coupled to said interconnect;

a plurality of caches that are each associated with a respective one of said plurality of processors, wherein a first cache among said plurality of caches includes:

data storage;

tag storage that stores ah address tag indicating an address of a data item contained in said data storage;

a coherency indicator having one or more valid states to indicate that an associated data item in said data storage is valid and a data-invalid state to indicate that said address tag in said tag storage is valid and that a data item in said data storage is invalid; and a cache controller including a queue from which said cache controller updates said cache, wherein responsive to detection of a data transfer on said interconnect associated with said address indicated by said address tag while said coherency indicator is set to said data-invalid state, said data transfer including a second data item, said cache controller selectively updating said first cache with said second data item only if a number of undates pending in said queue is less than a threshold number by (1) temporarily allocating an entry of said queue, (2) storing said second data item in said data storage in association with said address tag and (3) updating said coherency indicator to one of said one or more valid states.

13. The data processing system of claim 12, wherein said one or more valid states include a shared state to which said cache controller updates said coherency indicator when updating said cache to indicate that said second data item is stored in both said first cache and another of said plurality of caches.

14. The data processing system of claim 12, wherein said plurality of processors includes a first processor associated with said first cache, said cache controller further comprising:

means, responsive to a request by said first processor for data associated with said address indicated by said address tag while said coherency indicator in said first cache is set to said data-invalid state, for requesting valid data associated with said address from one of said plurality of caches associated with a processor among said plurality of processors other than said first processor.

15. The data processing system of claim 12, said coherency indicator further comprising an invalid state that indicates that both of said address tag and said first data item are invalid.

16. The data processing system of claim 12, wherein said data transfer comprises a response to a read-type request on said interconnect.

* * * * *